Patented July 29, 1952

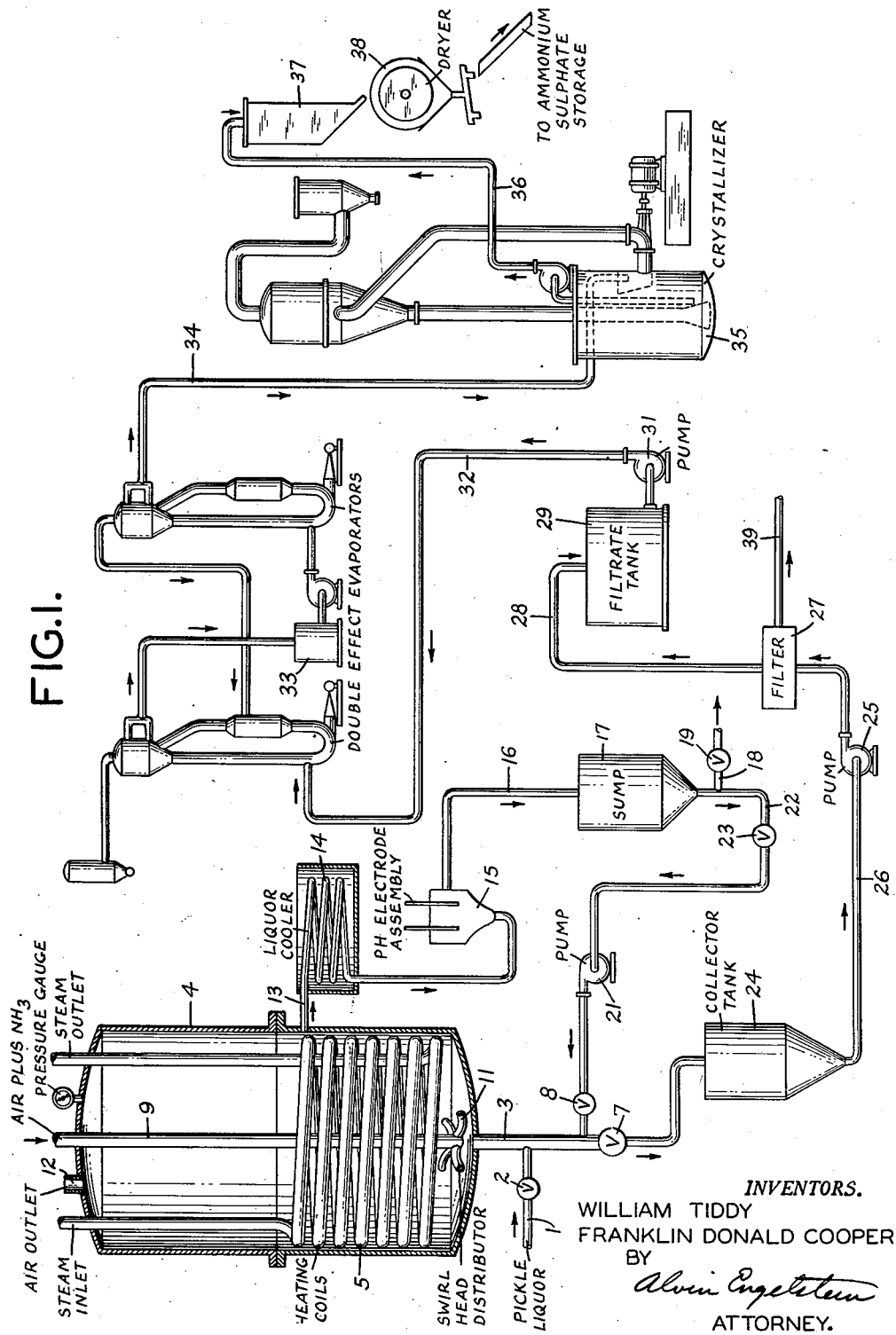
FIG.I.

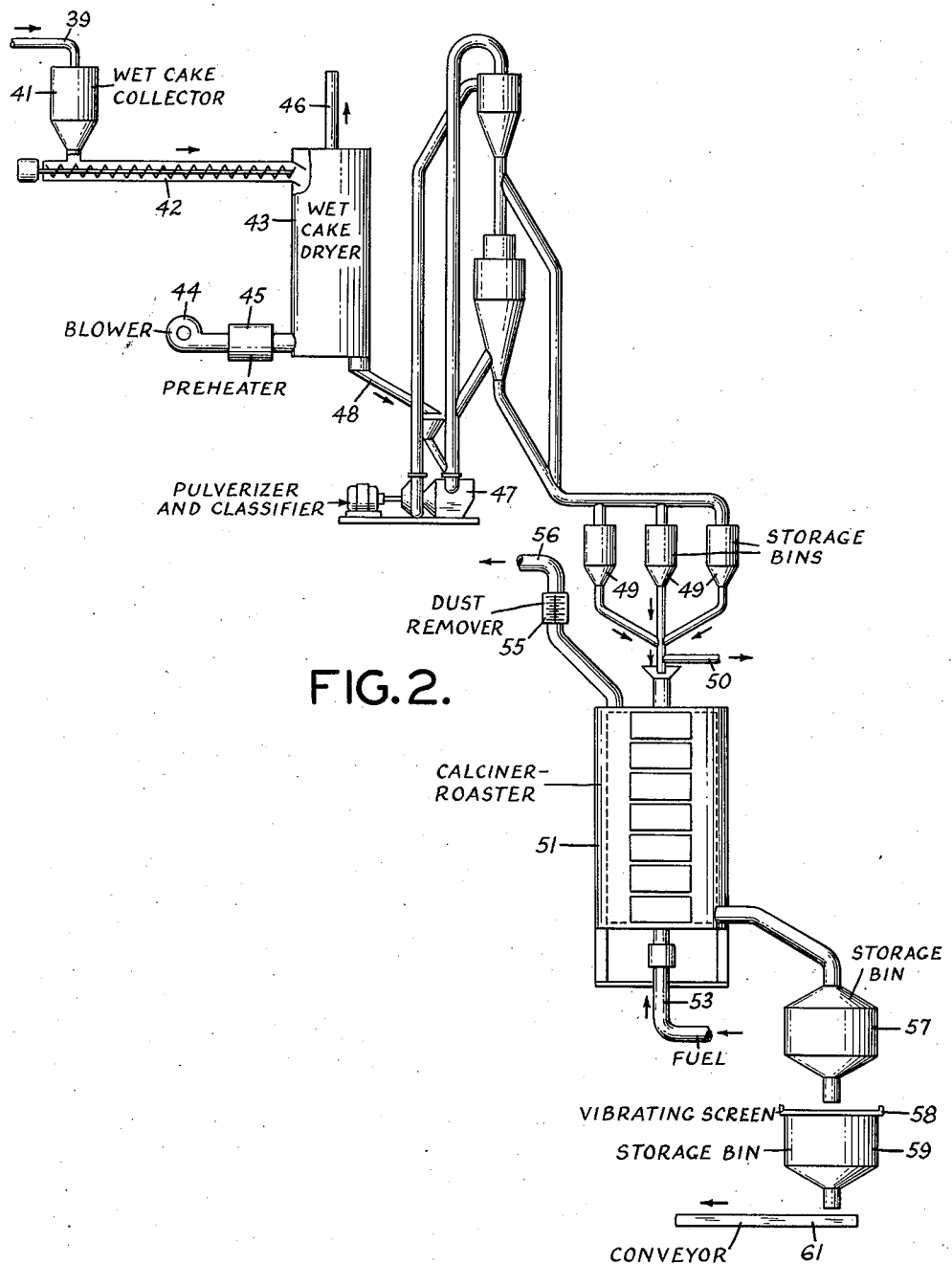

2,605,169

UNITED STATES PATENT OFFICE 2,605,169

TREATMENT OF WASTE PICKLE LIQUOR

William Tiddy, Manhasset, N. Y., and Franklin D. Cooper, Ashland, Ky., assignors to Allied Chemical & Dye Corporation, New York, N. Y., a corporation of New York Application May 26, 1948, Serial No. 29,328

3 Claims. (Cl. 23—200)

This invention relates to the treatment of liquors containing iron sulfate and more particularly refers to a new and improved process for the production of ammonium sulfate and powdered iron from waste pickle liquor.

The disposal of waste pickle liquor has become an ever-increasing and difficult problem. The average annual production of spent pickling liquor has been estimated to be about 600,000,000 gallons per year. Most manufacturers would prefer to relieve themselves of this unwanted by-product by releasing it into streams but are prevented by laws prohibiting the pollution of bodies of water. Many methods have been suggested for the treatment of pickle liquor, such as neutralization of the free acid with lime or scrap iron, evaporation to copperas, and reaction with ammonia for the production of iron compounds. Unfortunately, the iron products now recovered from pickle liquor have a limited market or are so low in value as to in most instances not exceed the cost of processing the waste pickle liquor.

An object of the present invention is to provide an efficient, economical process for treating waste pickle liquor to produce therefrom products which are in demand in large quantities and which have a high monetary value.

Another object of this invention is to provide a method for converting iron compounds in pickle liquor into powdered iron suitable for molding.

A further object of the invention is to provide a method for treating pickle liquor to produce a highly-active iron oxide suitable for purifying gases by removal of hydrogen sulfide therefrom.

Further objects and advantages will be apparent from the description and accompanying drawings.

In carrying out the present invention with waste pickle liquor, we have successfully produced powdered iron possessing the physical and chemical characteristics demanded for commercial use as well as a highly-active iron oxide suitable for removing hydrogen sulfide from gases containing the same.

Iron powder meeting commercial specifications with respect to chemical composition and particle size may be produced by reducing iron oxide precipitated from waste pickle liquor in the conventional manner. In practice such powdered irons were found unsatisfactory for molding due primarily to poor (slow) flow characteristics and low apparent density. Subsequent treatment of the iron by attrition converted the iron particles having rough-edged surfaces into smoother, more spherical particles which latter do not produce an entirely satisfactory molded iron product due to low briquetting strength. After extensive experimentation we have discovered that the conditions governing the precipitation of iron oxide from waste liquor determines to a large measure the flow characteristics and apparent density of the final iron product.

A method for effecting precipitation of iron oxide of the desired properties from pickle liquor in accordance with the present invention comprises introducing gaseous ammonia and air into waste pickle liquor maintained at an elevated temperature and pressure, regulating the introduction of gaseous ammonia to maintain the pickle liquor at a pH within the range of 6.0 to 7.0, regulating the introduction of air and ammonia to effect precipitation of the iron content in the pickle liquor whereby at least 80% of the precipitate is produced at a rate according to the formula:

$$K = \frac{L}{180T} \log_e \frac{A}{X}$$

wherein

K is the velocity constant for the rate of precipitation maintained between 0.010 and 0.020;

L is the concentration of ferrous sulfate in grams per liter in the waste liquor at the start of precipitation;

T is the time in minutes during a period of precipitation;

A is the concentration of ferrous sulfate in grams per liter in the waste liquor at the beginning of a period; and X is the concentration of ferrous sulfate in grams per liter at the end of a period;

and separating the precipitate from the liquor.

A preferred method of carrying out the precipitation of iron from pickle liquor in our process involves introducing an approximately 50–50 mixture of air and ammonia into waste liquor maintained at a temperature between 25° and 63° C. and a pressure of 15 to 60 pounds per square inch absolute, agitating the mixture of gases and liquor until the pH of the liquor is within the range of 6.0 to 6.2, increasing the temperature of the liquor to 90° C. or higher and the pressure to from 60 to 105 pounds per square inch absolute, introducing air containing declining amounts of gaseous ammonia into the liquor while maintaining the pH of the liquor between 6.3 and 6.7, regulating the introduction of air to effect precipitation of the iron content in the pickle liquor whereby at least 80% of the precipitate is produced at a rate according to the formula:

$$K = \frac{L}{180T} \log_e \frac{A}{X}$$

wherein

K is the velocity constant for the rate of precipitation maintained between 0.010 and 0.020;

L is the concentration of ferrous sulfate in grams per liter in the waste liquor at the start of precipitation;

T is the time in minutes during a period of precipitation;

A is the concentration of ferrous sulfate in grams per liter in the waste liquor at the beginning of a period; and X is the concentration of ferrous sulfate in grams per liter at the end of a period;

continuing the introduction of ammonia and air until the liquor contains no soluble iron, filtering and washing the iron precipitate, drying the precipitate at about 105° C. to remove moisture, and crushing the dried precipitate to give a product passing a No. 40 sieve.

We have found it desirable to subject the dried precipitate to further treatment prior to reducing it to powdered iron, which treatment comprises calcining the precipitate for about one hour by direct contact with combustion gases at a temperature between 1650° F. (899° C.) and 1900° F. (1038° C.), preferably about 1800° F. (982° C.) Calcination of the iron oxide preliminary to reduction shortens the time required to reduce the iron oxide and improves the quality of the powdered iron with respect to its purity and flow characteristics.

Reduction of the calcined oxides of iron to iron may be accomplished with hydrogen gas in a conventional manner or by treatment in a two-stage operation with coke oven gas and hydrogen as described in our copending application entitled Two-Stage Conversion of Iron Oxide Into Iron, filed May 26, 1948, Serial No. 29,326, now Patent No. 2,545,932, issued March 20, 1951, or else with recirculated coke oven gas as disclosed in our copending application entitled Conversion of Iron Oxide Into Iron With Coke Oven Gas, filed May 26, 1948, Serial No. 29,327, now Patent No. 2,545,933, issued March 20, 1951.

We have also discovered that the iron compounds produced by treating pickle liquor with gaseous ammonia and air in accordance with the practice of the present invention, and subsequently dried with hot air and crushed to completely pass a No. 40 mesh screen when mixed with wood shavings or other inert solid material and water to give a 50% free water content are highly efficient in the removal of hydrogen sulfide from gases and are capable of being effectively regenerated.

Figures 1 and 2 diagrammatically illustrate one method of carrying out our invention.

Referring to Fig. 1, waste pickle liquor from an external source is introduced through line 1, valve 2, line 3 into oxidizer 4 to a level between ½ and ⅔ of the height of oxidizer 4. Prior to charging vessel 4 with pickle liquor, valve 7 is closed; check valve 8 prevents any outflow of liquid from the oxidizer. Oxidizer 4 may be any suitable enlarged vessel designed to withstand superatmospheric pressure and lined with lead to prevent corrosion. After vessel 4 has been charged with pickle liquor to the desired capacity, valve 2 and other valves in conduits opening to oxidizer 4 are closed thereby sealing oxidizer 4 from the atmosphere.

Lead heating coil 5 immersed in the body of liquid provides a convenient method of heating oxidizer 4; steam enters steam inlet, flows through heating coil 5 and exhausts from steam outlet. When the pickle liquor has been elevated to a temperature within the range of 25°–63° C. a mixture of gaseous ammonia and air, preferably in equivolumetric proportions, is forced down through conduit 9 terminating in swirlhead distributor 11, which latter disperses the mixture of gases in the liquor thereby effecting intimate contact between them. After sufficient air has been introduced into oxidizer 4 to increase the pressure in the oxidizer to approximately 55 pounds per square inch absolute, a pressure release valve, not shown in the drawing, on air outlet 12 is opened to relieve air from the vessel in an amount to maintain the pressure constant at 55 pounds per square inch absolute. During the introduction of air and ammonia into oxidizer 4 a small stream of liquor is continuously withdrawn from the body of liquid through line 13, cooled in liquid cooler 14 to a temperature of approximately 30°–40° C. and thence passed into pH electrode assembly 15 wherein the pH of the liquor is continuously determined. The liquid then flows through line 16 into sump tank 17 from which it may be discharged as a waste product through line 18 and valve 19 or returned to oxidizer 4 by means of pump 21 through line 22 and valves 23 and 8. The flow of gaseous ammonia and air continues until the pH of the liquor has been brought within the range of 6.0 to 6.2. The primary function of this preliminary treatment of pickle liquor with gaseous ammonia is to neutralize the free acid in the liquor. Ordinarily no precipitation of solids from the liquid occurs during this intal stage of the operation.

An increased volume of steam is then passed through heating coil 5 until the temperature of the liquid is raised to 90° C. or higher. During this heating period a small amount of air is constantly introduced through line 1 for the purpose of agitating the contents in oxidizer 4. When the liquid attains a temperature of 90° C. a mixture of gaseous ammonia and air is again introduced into oxidizer 4 through conduit 9 and distributor head 11. Adjustment of pressure release valve on air outlet 12 is made to increase the pressure on oxidizer 4 to prevent substantial vaporization of water from the solution; normally, about 95 pounds per square inch absolute will be found sufficient. The pH of the liquor is continuously recorded by circulating a portion of the liquor through cooler 14, pH electrode assembly 15, sump 17 and pump 21 in a manner previously described in connection with the preliminary treatment of the pickle liquor. When the liquor attains a pH of 6.3 it will be found that decreasing amounts of gaseous ammonia are required to maintain the pH between 6.3 and 6.7.

As previously stated, in order to obtain the desired product, it is necessary to regulate the rate of precipitation of at least 80% of the precipitate formed in accordance with the formula:

$$K = \frac{L}{180T} \log_e \frac{A}{X}$$

wherein K is maintained between the values of 0.010 and 0.020. Changes in precipitation rate may be effected by varying the quantity of gases introduced into the pickle liquor. As a practical expedient, a few preliminary batches of pickle liquor may be run to determine the relative proportion and rate of gases introduced into the pickle liquor to obtain a rate of precipitation within the limits set forth in the formula. Once this has been established for a particular quality of pickle liquor the same rate and amount of gases may be introduced into each batch of similar pickle liquor.

Air and ammonia are continuously supplied to the solution in oxidizer 4 until the solution shows the absence of soluble iron which may be determined by withdrawing samples from sump 17 through line 18 and valve 19 or sample lines on oxidizer 4, not illustrated in the drawing, and testing the samples with potassium ferrocyanide solution.

Upon completion of the reaction, valve 7 is opened and the reaction products flow by gravity from the bottom of oxidizer 4 through line 3 into collector tank 24. In order to facilitate continuity of operation two or more oxidizers and related equipment may be employed for producing a more continuous flow of reaction products into collector tank 24.

The precipitate produced in accordance with the practice of our invention is a non-gelatinous solid, blue-black in color and contains approximately 71% of the total iron in a ferric state and approximately 29% of iron in a ferrous state.

The slurry of iron compound and ammonium sulfate solution is forced by pump 25 from collector tank 24 through line 26 into filter 27 for separation of the solids from the liquid. Rapid filtration is readily accomplished in filter 27 since the precipitate is a non-gelatinous solid. Filtrate passes through line 28 into filtrate tank 29 from which pump 31 forces it through line 32 into conventional double effect evaporators 33 wherein concentration of the ammonium sulfate solution occurs. Concentrated ammonium sulfate solution passes through line 34 into crystallizer 35 which may be of any conventional design and the crystalline product withdrawn therefrom through line 36 into hopper 37, dryer 38 and thence to storage. A high purity ammonium sulfate product practically free from iron is thus produced.

Moist precipitate containing about 29% of Fe in ferrous state and 71% of Fe in ferric state separated in filter 27 passes through conduit 39 into wet cake collector 41 (Fig. 2) and carried by conveyor 42 into the top of wet cake dryer 43. Air is forced by blower 44 through preheater 45 wherein its temperature is elevated to a temperature of approximately 105° C., thence upwardly countercurrent to the moist precipitate falling downwardly in wet cake dryer 43. Spent air vents from the top of wet cake dryer 43 through duct 46. Drying the precipitate with hot air in wet cake dryer 43 not only removes the moisture from the filter cake but also effects further oxidation of the iron compounds therein. The dried cake after air drying at 105° C. contains approximately 91% to 93% by weight of ferric oxide, the remainder being a ferrous compound. The relationship between ferric and ferrous compounds in the air-dried precipitate may be expressed in terms of total iron content, that is, the cake contains approximately 63.9 to 65.1% ferric iron and approximately 2.2 to 2% ferrous iron—the total iron content in the cake being about 66 to 67%.

Air-dried precipitate enters pulverizer and classifier 47 through duct 48 and the ground precipitate completely passing a No. 40 mesh sieve flows into storage bins 49 from which it drops into the top of vertical calciner roaster 51 or may be withdrawn through conduit 50 to be employed as a treating agent for the removal of hydrogen sulfide from gases. Fuel burned with air to generate combustion gases enter line 53 and pass upwardly through calciner roaster 51 countercurrent to the flow of precipitate therein. Any suitable liquid or gaseous fuel may be utilized as a source of the combustion gases. Exhaust gases leaving calciner roaster 51 after removal of dust in dust remover 55 are vented to the atmosphere through duct 56. After the iron oxide precipitate has been calcined at a temperature of approximately 1800° F. (982° C.) for a period of about one hour it is discharged into storage bin 57, screened by vibrating screen 58 and then passed into storage bin 59 from which it is conveyed by conveyor 61 to suitable apparatus for reducing the iron oxide to free iron.

The following examples illustrate the present invention:

*Example 1:* Waste pickle liquor containing 175 grams per liter FeSO$_4$ and 35 grams per liter free sulfuric acid enclosed in a pressure vessel containing steam heating coil to maintain the liquid contents at the desired temperature therein is treated with a 50–50 gaseous mixture of ammonia and air at a rate of approximately 5.5 cubic feet measured at 60° F. and 30 inches mercury per hour per gallon of waste liquor by passing the gaseous mixture in intimate contact with the waste liquor in the vessel until the liquor reaches a pH of 6.15. During this operation the waste liquor is maintained at a temperature of 45° C. and 55 pounds per square inch absolute pressure.

The temperature and pressure of the waste liquor in the vessel are then increased to about 98° C. and 95 pounds per square inch absolute. Air at the rate of about 27½ cubic feet measured at 60° F. and 30 inches mercury per hour per gallon of waste liquor together with sufficient gaseous ammonia to maintain the pH of the liquor at about 6.4 are introduced into the liquor to effect precipitation of the soluble iron therein. The rate of precipitation during the second stage of operation is carefully controlled in accordance with the formula:

$$K = \frac{L}{180T} \log_e \frac{A}{X}$$

During the operation samples of pickle liquor are frequently withdrawn and analyzed to determine the FeSO$_4$ content in the pickle liquor and necessary adjustments of rate of introduction of air and ammonia made to maintain the K value within the range of 0.010 to 0.020. After passing air and ammonia into the pickle liquor for 120 minutes the liquor is found to contain 28 grams per liter FeSO$_4$, i. e. 84% of the iron content in the pickle liquor is precipitated, during which period of time K is 0.015. The flow of air and ammonia into the pickle liquor is continued to remove the residual soluble FeSO$_4$ until tests with potassium ferro-cyanide solution show the substantial absence of soluble iron in the pickle liquor.

The treated pickle liquor is then filtered and the filter cake washed with water and dried at 105° C. The dried filter cake is crushed and then calcined for one hour at 1800° F. (982° C.) by direct contact with hot combustion gases generated by burning fuel oil. The calcined oxide is first reduced by passing coke oven gas at 1300° F. (703° C.) in a once through operation to reduce the iron oxide to a product containing approximately 3% FeO. Practically complete reduction of the iron oxide is effected by a second stage treatment with hydrogen gas at a temperature of 1740° F. (950° C.). The reduced product is then passed through an attrition mill to break up cohesion between the particles and place the particles in their natural free flowing state. The final product had the following characteristics: FeO—0.18%, carbon—0.29%, density grams per cc.—2.47, flow (50 grams—Hall Flowmeter)—37.1 seconds.

Example 2: Waste pickle liquor containing 156.8 grams per liter $FeSO_4$ and 32 grams per liter $H_2SO_4$ is treated with a 50-50 gaseous mixture of air and ammonia at the rate of about 5.0 cubic feet per hour per gallon of pickle liquor until it attained a pH of 6.18. During the introduction of the gaseous mixture the temperature and pressure maintained on the pickle liquor is 40° C. and 55 pounds per square inch absolute. The temperature of the pickle liquor is then elevated to 90° C. and the pressure increased to 75 pounds per square inch absolute. Air at the rate of about 28.5 cubic feet per hour per gallon of pickle liquor together with sufficient gaseous ammonia to maintain the pH at about 6.6 is introduced into the pickle liquor to effect precipitation of iron compounds therefrom. The K value during precipitation of 87% of the iron in the pickle liquor is held at 0.015. The introduction of air and ammonia is continued until the pickle liquor shows the absence of soluble iron. The reaction products are filtered and the filter cake water washed and dried in air at 105° C. The dried filter cake is crushed and calcined by direct contact with combustion gases at 1800° F. (982° C.) for one hour. The calcined iron oxide is then reduced by recirculating coke oven gas at a temperature of 1760° F. (960° C.) in contact with the iron oxide. The reduced iron after attrition to permit the iron product to attain its free flowing state is found to have the following characteristics: FeO—0.20%, carbon—0.29%, density grams per cc.—2.46, flow (50 grams)—34.8 seconds.

Example 3: Waste pickle liquor containing 183.9 grams per liter ferrous sulfate and 46 grams per liter free sulfuric acid is contacted with a 50-50 mixture of air and ammonia at the rate of about 6 cubic feet per hour per gallon of pickle liquor until the pH of the liquor increases to 6.2 during which time a temperature of 60° C. and a pressure of 60 pounds per square inch absolute are maintained on the liquor. The liquor is then heated to a temperature of 94° C. and the pressure increased to 80 pounds per square inch absolute. Air at the rate of about 40 cubic feet per hour per gallon of pickle liquor together with sufficient ammonia to maintain a pH of the liquor at 6.4 is continuously introduced into the pickle liquor to effect precipitation of iron compounds therefrom. 83% of the iron compounds is precipitated at a rate such that the K value for that period of time is 0.018. The mixture of air and ammonia is continued until the pickle liquor shows the absence of soluble iron. The precipitate is separated by filtration, water washed and dried in the presence of air at 105° C. It is then crushed and calcined for one hour at 1800° F. (982° C.) by direct contact with combustion gases. Reduction of the calcined precipitate is effected with hydrogen gas and then passed through an attrition mill to permit the particles to assume their free flowing state. The final product had the following characteristics: FeO—0.31%, carbon—0.24%, density grams per cc.—2.22, flow (50 grams)—39.1 seconds.

Example 4: Waste pickle liquor containing 186.1 grams per liter ferrous sulfate and 50 grams per liter sulfuric acid is treated with a 50-50 gaseous mixture of air and ammonia at the rate of about 6 cubic feet per hour per gallon of pickle liquor until it reaches a pH of 6.2. During the introduction of the gaseous mixture the temperature and pressure maintained on the pickle liquor are 60° C. and 60 pounds per square inch absolute. The temperature of the liquor is then elevated to 95° C. and the pressure increased to 95 pounds per square inch absolute. Air at the rate of about 26.7 cubic feet per hour per gallon of pickle liquor together with sufficient gaseous ammonia to maintain the pH at about 6.5 is introduced into the pickle liquor to effect precipitation of iron compounds therefrom. The K value for the period of time required to precipitate 92% of the iron from pickle liquor is held at 0.019. The introduction of air and ammonia is continued until the pickle liquor shows the absence of soluble iron. The reaction products are filtered and the filter cake washed with water and dried by passing a stream of air at 105° C. in contact with the cake. The dried filter cake is crushed to completely pass a No. 40 mesh screen.

The air dried precipitate consisting essentially of $Fe_2O_3$ is admixed with other components in approximately the following proportions to form a composition of matter suitable for the removal of hydrogen sulfide from gases containing the same.

Gas purifying composition

| | Parts by weight |
|---|---|
| Air dried precipitate | 26.0 |
| Soda ash | 1.25 |
| Coal refuse inerts | 22.75 |
| Water | 50.00 |

The above composition had an $Fe_2O_3$ content of about 25%. 100 parts of the above mixture are fluffed on 20 parts by weight of wood shavings before use as gas purification material.

The gas purifying composition is subjected to the Kunburger Fouling Test (a standard method for determining the activity of a gas purifying material for removal of hydrogen sulfide from gases) which resulted in the gas purification material increasing in weight by 12.16% due to the adsorption of hydrogen sulfide.

For comparative purposes a widely used commercial product referred to in the industry as "Lavino" composed of $Fe_2O_3$, soda ash, inerts and water with an $Fe_2O_3$ content of about 47% was also subjected to the Kunburger Fouling Test under the same conditions as our gas purifying composition. The Lavino material although it contained almost twice the amount of $Fe_2O_3$ absorbed 10% less hydrogen sulfide.

Although certain preferred embodiments of the invention have been disclosed for purposes of illustration, it will be evident that various changes and modifications may be made therein without departing from the scope and spirit of the invention which is not to be limited save as defined in the appended claims.

We claim:

1. A process for the treatment of waste pickle liquor containing about 10 to 30% ferrous sulfate and free sulfuric acid which comprises in a first stage treatment introducing a gaseous mixture of air and ammonia into waste liquor maintained at a temperature between 25° and 63° C. and a pressure of 15 to 60 pounds per square inch absolute until the pH of the waste liquor is within the range of 6.0 to 6.2, and in a second stage treatment increasing the temperature of the liquor to at least 90° C. and the pressure to from 60 to 105 pounds per square inch absolute, introducing air containing declining amounts of gaseous ammonia into the liquor while maintaining the pH of the liquor between 6.3 and 6.7, limiting the addition of ammonia gas to not in excess of stoichiometric requirements to react with ferrous sulfate, regulating the introduction of air and gaseous ammonia into the pickle liquor during said second stage treatment in accordance with changes in periodically determined concentrations of ferrous sulfate in the liquor to precipitate about 80 to 95% of the iron content in the pickle liquor, said precipitation of the iron content in the pickle liquor being maintained by said regulation of air and gaseous ammonia at a rate sufficient to maintain the value of K between 0.010 and 0.020 in the formula:

$$K = \frac{L}{180T} \log_e \frac{A}{X}$$

wherein:

K is the velocity constant for the rate of precipitation;
L is the concentration of ferrous sulfate in grams per liter in the waste liquor at the start of precipitation;
T is the time in minutes during a period of precipitation; a period being the time between which two determinations of ferrous sulfate concentration are made;
A is the concentration of ferrous sulfate in grams per liter in the waste liquor at the beginning of said period; and
X is the concentration of ferrous sulfate in grams per liter at the end of said period;

and separating the precipitate, the total iron of which is predominantly in a ferric state, from the liquor.

2. A process for the treatment of waste pickle liquor containing about 10 to 30% ferrous sulfate and free sulfuric acid which comprises in a first stage treatment introducing a gaseous mixture of air and ammonia into waste liquor maintained at a temperature between 25° and 63° C. and a pressure of 15 to 60 pounds per square inch absolute until the pH of the waste liquor is within the range of 6.0 to 6.2, and in a second stage treatment increasing the temperature of the liquor to at least 90° C. and the pressure to from 60 to 105 pounds per square inch absolute, introducing air containing declining amounts of gaseous ammonia into the liquor while maintaining the pH of the liquor between 6.3 and 6.7, limiting the addition of ammonia gas to not in excess of stoichiometric requirements to react with ferrous sulfate, regulating the introduction of air and gaseous ammonia into the pickle liquor during said second stage treatment in accordance with changes in periodically determined concentrations of ferrous sulfate in the liquor to precipitate about 80 to 95% of the iron content in the pickle liquor, said precipitation of the iron content in the pickle liquor being maintained by said regulation of air and gaseous ammonia at a rate sufficient to maintain the value of K between 0.010 and 0.020 in the formula:

$$K = \frac{L}{180T} \log_e \frac{A}{X}$$

wherein

K is the velocity constant for the rate of precipitation;
L is the concentration of ferrous sulfate in grams per liter in the waste liquor at the start of precipitation;
T is the time in minutes during a period of precipitation; a period being the time between which two determinations of ferrous sulfate concentration are made;
A is the concentration of ferrous sulfate in grams per liter in the waste liquor at the beginning of said period; and
X is the concentration of ferrous sulfate in grams per liter at the end of said period;

separating the precipitate, the total iron of which is predominantly in a ferric state, from the liquor, and drying the precipitate in the presence of air at a temperature of about 105° C.

3. A process for the treatment of waste pickle liquor containing about 10 to 30% ferrous sulfate and free sulfuric acid which comprises in a first stage treatment introducing a gaseous mixture of air and ammonia into waste liquor maintained at a temperature between 25° and 63° C. and a pressure of 15 to 60 pounds per square inch absolute until the pH of the waste liquor is within the range of 6.0 to 6.2, and in a second stage treatment increasing the temperature of the liquor to at least 90° C. and the pressure to from 60 to 105 pounds per square inch absolute, introducing air containing declining amounts of gaseous ammonia into the liquor while maintaining the pH of the liquor between 6.3 and 6.7, limiting the addition of ammonia gas to not in excess of stoichiometric requirements to react with ferrous sulfate, regulating the introduction of air and gaseous ammonia into the pickle liquor during said second stage treatment in accordance with changes in periodically determined concentrations of ferrous sulfate in the liquor to precipitate about 80 to 95% of the iron content in the pickle liquor, said precipitation of the iron content in the pickle liquor being maintained by said regulation of air and gaseous ammonia at a rate sufficient to maintain the value of K between 0.010 and 0.020 in the formula:

$$K = \frac{L}{180T} \log_e \frac{A}{X}$$

wherein

K is the velocity constant for the rate of precipitation;
L is the concentration of ferrous sulfate in grams per liter in the waste liquor at the start of precipitation;
T is the time in minutes during a period of precipitation; a period being the time between which two determinations of ferrous sulfate concentration are made;
A is the concentration of ferrous sulfate in grams per liter in the waste liquor at the beginning of said period; and
X is the concentration of ferrous sulfate in grams per liter at the end of said period;

separating the precipitate, the total iron of which is predominantly in a ferric state, from the liquor, drying the precipitate in the presence of air at a temperature of about 105° C., crushing the dried precipitate and calcining the precipitate for about one hour by direct contact with combustion gases at a temperature between 899° C. and 1038° C.

WILLIAM TIDDY.
FRANKLIN D. COOPER.

REFERENCES CITED

The following references are of record in the file of this patent:

UNITED STATES PATENTS

| Number | Name | Date |
|---|---|---|
| 868,385 | Wulffing | Oct. 15, 1907 |
| 961,764 | Falding | June 21, 1910 |
| 1,275,232 | Edison | Aug. 13, 1918 |
| 1,824,936 | Travers | Sept. 29, 1931 |
| 1,994,702 | Harris | Mar. 19, 1935 |
| 2,065,618 | Sherwood | Dec. 29, 1936 |
| 2,133,267 | Ayers | Oct. 18, 1938 |
| 2,330,553 | Butler | Sept. 28, 1943 |
| 2,339,793 | Moeklebust et al. | Jan. 25, 1944 |
| 2,365,202 | Marek | Dec. 19, 1944 |
| 2,374,454 | Oliver et al. | Apr. 24, 1945 |
| 2,419,240 | Wilson | Apr. 22, 1947 |
| 2,427,555 | Elzi | Sept. 16, 1947 |
| 2,443,765 | Francis | June 22, 1948 |
| 2,529,874 | Hoak | Nov. 14, 1950 |

FOREIGN PATENTS

| Number | Country | Date |
|---|---|---|
| 376,719 | Great Britain | Jan. 9, 1931 |